R. C. WICKHAM.
Milk Can.
No. 60,603. Patented Dec. 18, 1866.
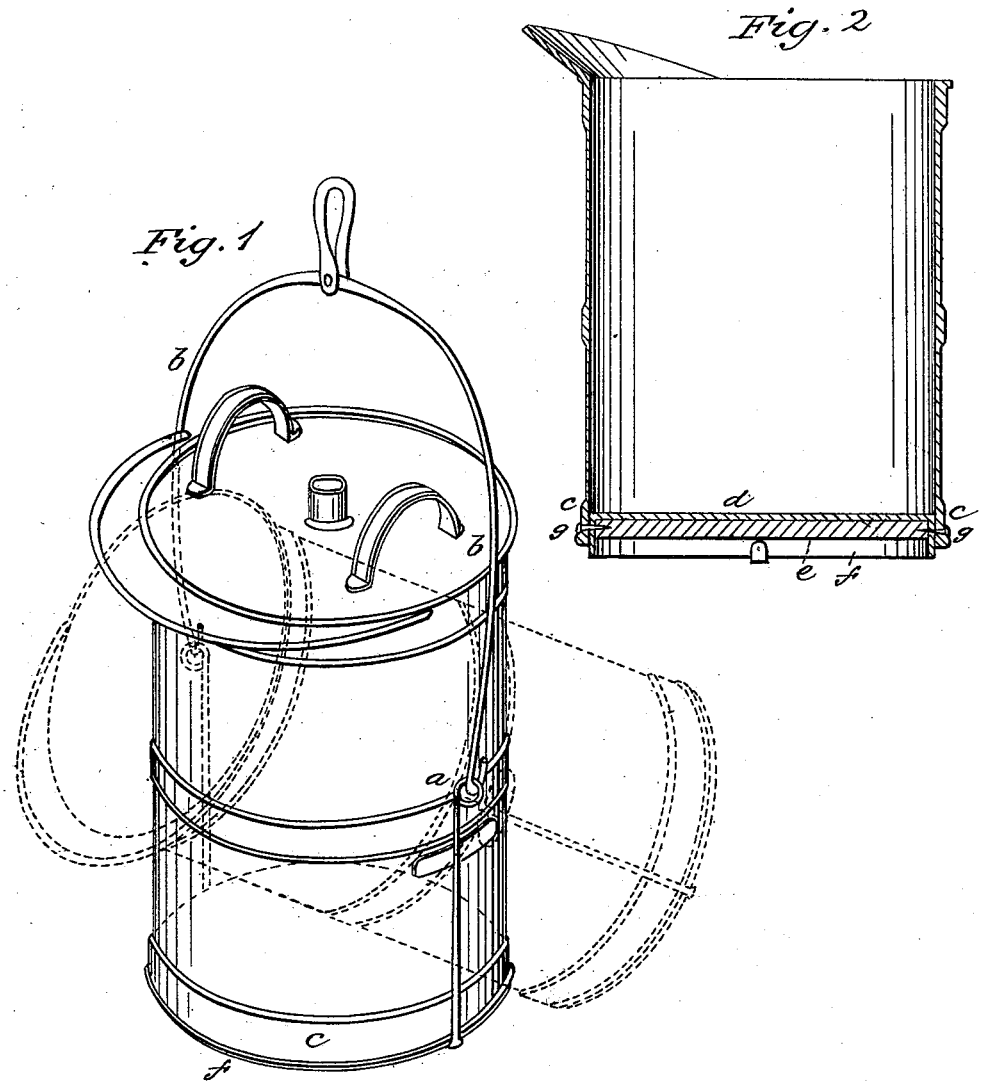
Witnesses:
Jos. L. Coombs
M. ambler Bailey
Inventor:
R. C. Wickham
by
A. Pollok
his atty

United States Patent Office.

IMPROVEMENT IN MILK CANS.

ROLLIN C. WICKHAM, OF PAWLET, VERMONT.

Letters Patent No. 60,603, dated December 18, 1866.

The Schedule referred to in these Letters Patent and making part of the same.

TO ALL WHOM IT MAY CONCERN:

Be it known that I, ROLLIN C. WICKHAM, of Pawlet, in the county of Rutland, and State of Vermont, have invented certain new and useful improvements in Dumping or Emptying Milk Cans; and I hereby declare that the following is a full, clear, and exact description of the same, reference being had to the accompanying drawings, in which—

Figure 1 represents a perspective view of a milk can constructed in accordance with my invention; and Figure 2, a vertical section of the same, showing the construction of the bottom of the can.

This invention relates to a new and improved method of emptying milk from cans at cheese factories. By the old method the milk, when brought to the factory, is drawn off from the can into a reservoir by means of a faucet at the bottom of the can. This operation is necessarily tedious, the flow of milk being very limited, and much time is therefore consumed in emptying a single can. This difficulty is proposed to be obviated by my invention, which I have illustrated in the accompanying drawing representing a perspective view of a can constructed in accordance with my invention. The figure in black lines in the said drawing is the can in an upright position, and the figure in red lines the same when tilted. To the sides of a milk can of ordinary or suitable construction, I attach ears, $a$, diametrically opposite to each other, and placed on the sides of the can at such a height that, when raised by the ears from the platform of the car or wagon, the can will be balanced, or nearly so. When it is required to empty the can a bail, $b$, is attached to the ears, and the can is slightly lifted off the platform by means of a tackle. Being nearly balanced in this position, as has before been said, it requires but a slight exertion to tilt the can, and to empty the contents thereof into the reservoir.

The bottom of a milk can constructed in accordance with my invention is composed as follows: A tin bottom, $d$, is soldered, as in the case of any ordinary bottom, to the sides of the can, which extend some distance below the tin bottom, as seen at $c$, protecting the latter, and serving as a rim or flange by which the wooden bottom, hereinafter described, is held in place. $e$ is a wooden plate or disk, placed immediately underneath and in contact with the tin bottom, serving to support and hold up the same against the pressure of the milk contained in the can, and to protect it from being broken, cut, or injured by ordinary wear and tear. Between the periphery of this wooden disk and the sides of the can is placed a hoop or strip of iron, $f$, or other suitable metal, which still further serves to strengthen the bottom. The hoop and wooden disk are secured to the sides of the can by iron pins, $g$, or other suitable means. The lower ends of the ears on the sides extend downwards below the bottom, and are bent over the hoop, binding it firmly to the can.

Having thus described my invention, what I claim, and desire to secure by Letters Patent, is—

The construction and arrangement of milk cans with reference to the supporting bottom and ears as herein described, to be operated in the manner and for the purposes set forth.

In testimony whereof I have signed my name to this specification before two subscribing witnesses.

ROLLIN C. WICKHAM.

Witnesses:
JEROME B. BROMLEY,
F. W. HOYT.